No. 768,096. PATENTED AUG. 23, 1904.
R. UELTSCHI.
DRAFT MECHANISM FOR VEHICLES.
APPLICATION FILED SEPT. 16, 1903.
NO MODEL.
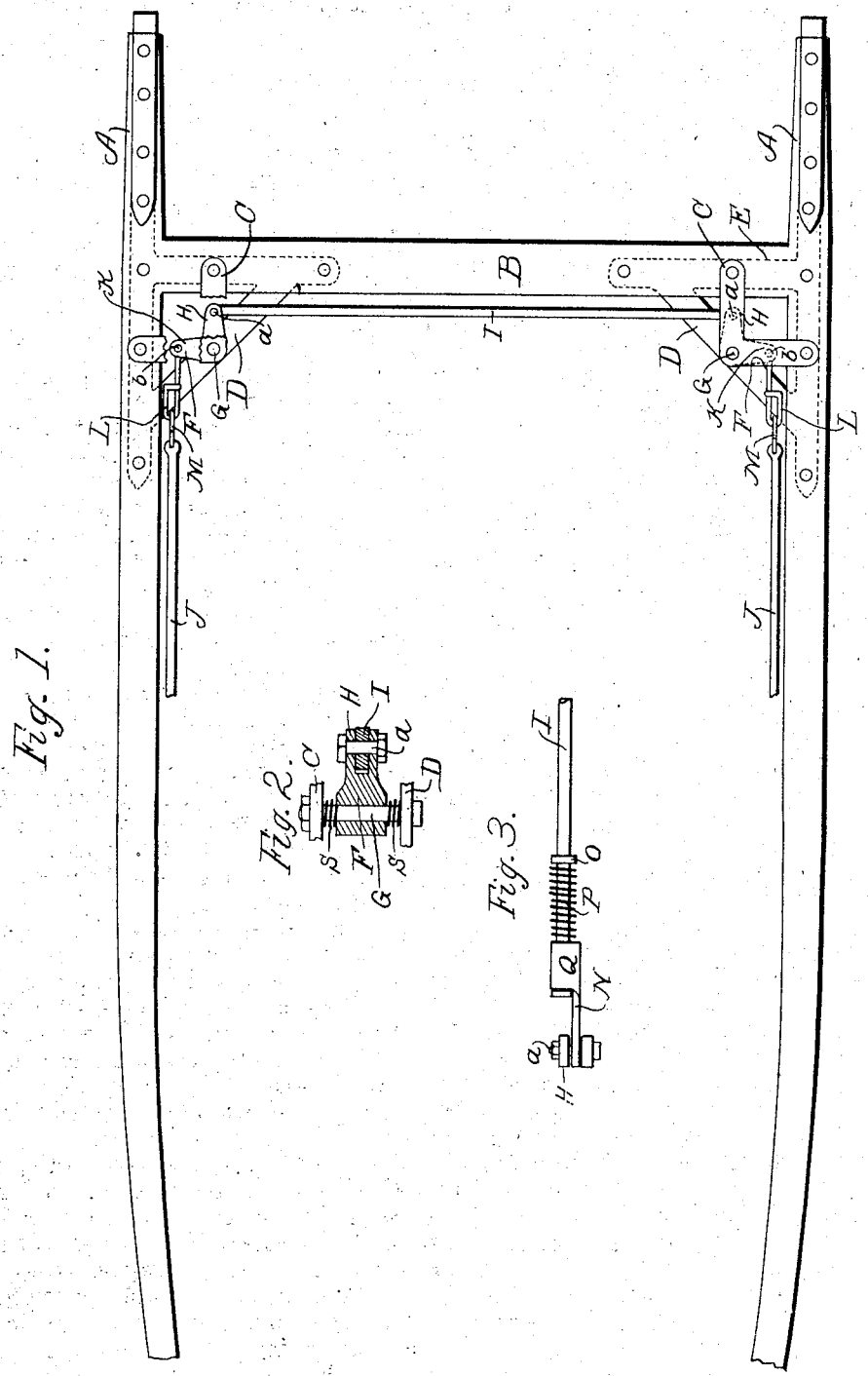

No. 768,096.

Patented August 23, 1904.

UNITED STATES PATENT OFFICE.

ROBERT UELTSCHI, OF FRANKFORT, KENTUCKY.

DRAFT MECHANISM FOR VEHICLES.

SPECIFICATION forming part of Letters Patent No. 768,096, dated August 23, 1904.

Application filed September 16, 1903. Serial No. 173,390. (No model.)

*To all whom it may concern:*

Be it known that I, ROBERT UELTSCHI, a citizen of the United States, residing at Frankfort, county of Franklin, and State of Kentucky, have invented new and useful Improvements in Draft Mechanism for Vehicles, of which the following is a specification.

My invention relates to an improved form of draft mechanism for vehicles which is adapted to serve as a substitute for the ordinary swingletree heretofore used for connecting the harness-traces with the shafts of a vehicle.

With the ordinary swingletree the load of the vehicle is brought to bear at a single point at or near the center of the swingletree and the draw-bar of the thill, whereby such parts are frequently broken.

The object of my invention is, first, to provide a device by which the draft of the load will be brought to bear near the thills at or near the respective ends of the draw-bar, whereby the strain upon such bar is diminished, and the same may be made lighter than would otherwise be required when used in connection with the ordinary swingletree, and, second, by the substitution of a connecting-rod and elbow crank-levers to dispense with the swingletree heretofore used for equalizing the draft of the traces upon the vehicle.

The construction of my invention is explained by reference to the accompanying drawings, in which—

Figure 1 represents a bottom view of a pair of thills provided with my improved form of draft mechanism. Fig. 2 is a detail showing the manner of connecting the elbow crank-levers with their supporting-brackets, and Fig. 3 is a detail showing a modified form of connecting the elbow crank-levers yieldingly together.

Like parts are identified by the same reference-letters throughout the several views.

A A are the vehicle-thills.

B is a draw-bar.

The thills A are connected together by the draw-bar B and the brace-irons C, D, and E. The brace-irons C and D serve as a support for the elbow crank-levers F, which are interposed between said brace-irons and secured in place upon the pivotal bolts G. The rear ends H of the elbow crank-levers are connected together by the rod I and pivotal bolts *a a*.

J J are the harness-traces, which are respectively connected with the arms K K of the elbow crank-levers by the hooks L, pivotal bolts *b b*, and links M. Thus it will be obvious that the draft brought to bear upon the arms K K of the elbow crank-levers will be equalized through the connecting-rod I and that the rod I in conjunction with the elbow crank-levers performs the functions and serves the purpose of the swingletree heretofore used.

In the modified form shown in Fig. 3 a bracket N is interposed between the arm H of the elbow crank-lever and the rod I, and said rod I is provided with a rigidly-affixed collar O and a spring P, which spring is interposed between the collar O and the sleeve Q of said bracket. The office of this spring is to hold said rod firmly in place in the sleeve Q and prevent such connecting parts from rattling. It will of course be understood that the bracket N, sleeve Q, and spring P may be used at both ends of the connecting-rod I.

To prevent the elbow crank-levers from rattling in their bearings between their supporting brace-irons C and E, I preferably interpose short spiral springs S S between said elbow crank-levers and said brace-irons, as shown in Fig. 2, whereby the wear between such parts is taken up by the elasticity of said springs and said parts are prevented from rattling.

While I have shown the connecting-rod I located in front of the draw-bar, said rod is not necessarily located at such point, but may, if desired, be located above, beneath, or in the rear of said draw-bar, as may be found desirable, in which case the location of said elbow crank-levers and supporting-bearings is changed accordingly.

Having thus described my invention, what I claim as new, and desire to secure by Letters Patent, is—

The combination with the thills and draw-bar of a vehicle, of two pairs of diagonally-arranged brace-irons communicating respectively between the respective thills and the draw-bar; a pair of elbow crank-levers pivotally supported from and between said brace-irons; a bracket pivotally connected with the rearwardly-extending arms of one of said elbow crank-levers; a transversely-arranged rod slidably connected at one of its ends with said bracket and at its other end with the rearwardly-extending arm of the other elbow crank-lever; a collar rigidly affixed to said transversely-arranged rod at a slight distance from said bracket; a spiral spring interposed between said collar and bracket upon said rod and means for connecting the opposite ends of said elbow crank-levers with the traces of a harness, all substantially as, and for the purpose specified.

In testimony whereof I affix my signature in the presence of two witnesses.

ROBERT UELTSCHI.

Witnesses:
W. H. HAWKINS,
L. C. WALLACE.